(12) United States Patent
Gross et al.

(10) Patent No.: US 11,941,556 B2
(45) Date of Patent: Mar. 26, 2024

(54) RECOMMENDING INVESTIGATION INSTRUCTIONS FOR LOG BASED ALERTS IN A COMPUTERIZED SYSTEM

(71) Applicant: LogsHero Ltd., Tel-Aviv (IL)

(72) Inventors: Amit Gross, Kfar-Saba (IL); Asaf Yigal, Tel-Aviv (IL)

(73) Assignee: LogsHero Ltd., Tel-Aviv (IL)

( * ) Notice: Subject to any disclaimer, the term of this patent is extended or adjusted under 35 U.S.C. 154(b) by 0 days.

(21) Appl. No.: 17/498,895

(22) Filed: Oct. 12, 2021

(65) Prior Publication Data
US 2023/0116109 A1    Apr. 13, 2023

(51) Int. Cl.
*G06Q 10/0631* (2023.01)
*H04L 43/045* (2022.01)
*H04L 43/06* (2022.01)

(52) U.S. Cl.
CPC ...... *G06Q 10/06311* (2013.01); *H04L 43/045* (2013.01); *H04L 43/06* (2013.01)

(58) Field of Classification Search
CPC .. H04L 43/045; H04L 43/06; G06Q 10/06311
See application file for complete search history.

(56) References Cited

U.S. PATENT DOCUMENTS

| | | | | |
|---|---|---|---|---|
| 11,017,300 B1 * | 5/2021 | Kapoor | ............ | G06Q 10/06311 |
| 11,099,928 B1 * | 8/2021 | Vah | ........................ | G06N 3/044 |
| 11,176,464 B1 * | 11/2021 | Sagi | ........................ | G06N 7/01 |
| 2013/0145205 A1 * | 6/2013 | Lee | ........................ | H04L 41/064 |
| | | | | 714/E11.112 |
| 2014/0074870 A1 * | 3/2014 | Bullis | ..................... | G06Q 10/20 |
| | | | | 707/758 |
| 2017/0264501 A1 * | 9/2017 | Mathen | .................... | H04L 41/14 |
| 2021/0294481 A1 * | 9/2021 | Morris | .................. | G06F 16/245 |
| 2021/0342214 A1 * | 11/2021 | Madawat | ............ | G06F 11/3006 |
| 2022/0028511 A1 * | 1/2022 | Neumann | ................ | G06N 7/01 |

* cited by examiner

*Primary Examiner* — Glenton B Burgess
*Assistant Examiner* — Jihad K Boustany

(57) ABSTRACT

An incident management system comprises a processor adapted for: receiving a plurality of logs each documenting at least one historical investigation instruction executed in the management system and each comprising a parameter range of the historical instruction and a presentation type of response data received in response to executing the historical instruction; and in each of a plurality of iterations: receiving from a GUI of the management system an incident report selected by a user from a plurality of incident reports presented therein; generating, based on the incident report and an analysis of the logs, a sequence of investigation instructions for generating part of the GUI depicting analysis data for cause-analysis of an incident documented by the incident report; and presenting the sequence of instructions in the GUI such that when the user selects one of the sequence of instructions, the selected instruction is executed by the processor.

22 Claims, 6 Drawing Sheets

RECOMMENDING INVESTIGATION INSTRUCTIONS FOR LOG BASED ALERTS IN A COMPUTERIZED SYSTEM

FIELD AND BACKGROUND OF THE INVENTION

Some embodiments described in the present disclosure relate to a computerized system and, more specifically, but not exclusively, to managing incidents in a computerized system.

In the field of information technology (IT), the term incident refers to an unplanned interruption to a service provided by a computerized system, a reduction in the quality of the service, or an event that has not yet impacted the service but may impact the service at a future time. The term incident management refers to practices and tools used to detect, record, investigate and resolve incidents occurring in a computerized system.

An incident management system is a computerized system for monitoring and managing incidents in a monitored computerized system. For brevity, henceforth the term management system refers to an incident management system and the term monitored system refers to a monitored computerized system. It is common practice for a management system for managing a monitored system to have access to a plurality of event reports from the monitored system. An event report may be an entry in a log repository of the monitored system, for example a log entry entered when usage of a resource exceeds an identified usage threshold, for example when a non-volatile storage becomes full or when a digital communication network becomes congested. Other examples of an event report are a message received from the monitored system, for example an alert message. A possible example of an alert message is a message generated by the monitored system upon identifying an attempt at an unauthorized access. Another example of an alert message is a message generated by the monitored system upon identifying that a log entry added to the monitored system's log repository is marked with a high severity. The management system may retrieve an event report by polling a component of the monitored system.

In some implementations of a management system, the management system analyzes the plurality of event reports to detect one or more incidents in the monitored system, and when an incident is detected the management system produces an incident report documenting the incident. In some implementations, the monitored system provides the incident report to an IT professional. For example, in some management systems one or more incident reports are presented to the IT professional in a graphical user interface (GUI) of the management system.

SUMMARY OF THE INVENTION

It is an object of some embodiments described in the present disclosure to provide a system and a method for incident management comprising generating a proposed sequence of investigation instructions for generating part of an incident management system's GUI that depicts analysis data for cause-analysis of an incident documented by an incident report. In some such embodiments, the proposed sequence of investigation instructions is generated based on an analysis of a plurality of logs documenting one or more historical investigation instructions.

The foregoing and other objects are achieved by the features of the independent claims. Further implementation forms are apparent from the dependent claims, the description and the figures.

According to a first aspect of the invention, an incident management system comprises at least one hardware processor adapted for: receiving a plurality of logs each documenting at least one historical investigation instruction executed in the incident management system and each comprising at least one parameter range of the at least one historical investigation instruction and a presentation type of response data received in response to executing the at least one historical investigation instruction; and in each of a plurality of iterations: receiving from a graphical user interface (GUI) of the incident management system an incident report selected by a user from a plurality of incident reports presented therein; generating, based on the incident report and an analysis of the plurality of logs, a sequence of investigation instructions for generating part of the GUI of the incident management system depicting analysis data for cause-analysis of an incident documented by the incident report; and presenting the sequence of investigation instructions in the GUI of the incident management system such that when the user selects at least one of the sequence of investigation instructions, the selected at least one investigation instruction is executed by the at least one hardware processor. Generating a sequence of investigation instructions based on an analysis of the plurality of logs increases accuracy of the sequence of investigation instructions and thus increases usability of the incident management system. Presenting the sequence of investigation instructions in the GUI of the incident management system such that one or more investigation instructions are executed when selected reduces an amount of time required to perform a cause-analysis of an incident documented by the incident report and increases usability of the incident management system.

According to a second aspect of the invention, a method for an incident management system comprises: receiving a plurality of logs each documenting at least one historical investigation instruction executed in the incident management system and each comprising at least one parameter range of the at least one historical investigation instruction and a presentation type of response data received in response to executing the at least one historical investigation instruction; and in each of a plurality of iterations: receiving from a graphical user interface (GUI) of the incident management system an incident report selected by a user from a plurality of incident reports presented therein; generating, based on the incident report and an analysis of the plurality of logs, a sequence of investigation instructions for generating part of the GUI of the incident management system depicting analysis data for cause-analysis of an incident documented by the incident report; and presenting the sequence of investigation instructions in the GUI of the incident management system such that when the user selects at least one of the sequence of investigation instructions, the selected at least one investigation instruction is executed by at least one hardware processor.

According to a third aspect of the invention, a software program product for incident management, comprising: a non-transitory computer readable storage medium; first program instructions for receiving a plurality of logs each documenting at least one historical investigation instruction executed in the incident management system and each comprising at least one parameter range of the at least one historical investigation instruction and a presentation type of response data received in response to executing the at least one historical investigation instruction; and second program instructions for in each of a plurality of iterations: receiving from a graphical user interface (GUI) of the incident management system an incident report selected by a user from a plurality of incident reports presented therein; generating, based on the incident report and an analysis of the plurality of logs, a sequence of investigation instructions for generating part of the GUI of the incident management system depicting analysis data for cause-analysis of an incident documented by the incident report; and presenting the sequence of investigation instructions in the GUI of the incident management system such that when the user selects at least one of the sequence of investigation instructions, the selected at least one investigation instruction is executed by at least one hardware processor; wherein the first and second program instructions are executed by at least one computerized processor from the non-transitory computer readable storage medium.

With reference to the first and second aspects, in a first possible implementation of the first and second aspects of the present invention the analysis of the plurality of logs comprises: identifying a plurality of historical incident reports by identifying in the plurality of logs a plurality of historical incident report selections, each selecting a historical incident report similar to the incident report according to at least one incident similarity test; identifying in the plurality of logs a plurality of historical investigation instructions each associated with one of the plurality of historical incident reports; and clustering the plurality of historical investigation instructions in a plurality of instruction clusters according to the respective investigation instruction, the respective at least one parameter range and the respective presentation type. Clustering the plurality of historical investigation instructions according to the respective investigation instruction enables analyzing similar instructions together and increases accuracy of identifying a relative contribution of similar instructions, thus increasing accuracy of the generated sequence of investigation instructions. Optionally, the analysis of the plurality of logs further comprises computing a plurality of scores, each for one of the plurality of instruction clusters and indicative of a contribution, to at least one cause-analysis of at least one historical incident documented by a respective group of historical investigation instructions clustered in the respective instruction cluster, of the respective group of historical investigation instructions and of the respective at least one parameter range thereof and the respective presentation type thereof. Optionally, generating the sequence of investigation instructions is according to the plurality of scores. Generating the sequence of investigation instructions according to a plurality of scores, each indicative of a contribution of a respective instruction cluster to one or more cause-analysis of at least one historical incident increases accuracy of the generated sequence of investigation instructions, reducing an amount of time to perform another cause-analysis of the incident documented by the incident report. Optionally, generating the sequence of investigation instructions according to the plurality of scores comprises generating at least one new instruction by: selecting an instruction cluster of the plurality of instruction clusters according to the plurality of scores; and generating an executable instruction comprising at least part of at least one of the respective group of historical investigation instructions, at least one new parameter range computed according to the respective at least one parameter range of the selected instruction cluster and a new presentation type computed according to the respective presentation type of the selected instruction cluster. Generating an executable instruction comprising one or more components computed according to the selected instruction cluster increases accuracy of the executable instruction thus increasing accuracy of the sequence of investigation instructions. Optionally, presenting the sequence of investigation instructions comprises presenting an interface for the user to select the executable instruction. Presenting an interface for the user to select the executable instruction increases ease of use of the incident management system.

With reference to the first and second aspects, or the first implementation of the first and second aspects, in a second possible implementation of the first and second aspects of the present invention clustering the plurality of historical investigation instructions comprises: computing a plurality of terms extracted from the plurality of logs and comprising a plurality of parameter ranges of the plurality of historical investigation instructions, a plurality of presentation types of the plurality of historical investigation instructions, and a plurality of parts of instructions; and computing a plurality of statistical values using the plurality of terms. Computing a plurality of statistical values using a plurality of terms extracted from the plurality of logs increases accuracy of the plurality of clusters, and thus increases accuracy of the sequence of investigation instructions generated according to the plurality of clusters. Optionally, clustering the plurality of historical investigation instructions further comprises: computing a plurality of cosine-similarity values, each for two of the plurality of terms; and applying an ordering points to identify the clustering structure (OPTICS) method to the plurality of cosine-similarity values.

With reference to the first and second aspects, or the first implementation of the first and second aspects, in a third possible implementation of the first and second aspects of the present invention computing the plurality of scores comprises for each instruction cluster of the plurality of instruction clusters: computing a plurality of cluster terms extracted from the respective group of historical investigation instructions of the instruction cluster and from the respective at least one parameter range thereof and the respective presentation type thereof; computing the respective score of the instruction cluster using the plurality of cluster terms and a plurality of cluster statistical values computed using the plurality of cluster terms. Optionally, computing the respective score of the instruction cluster comprises: computing a plurality of cluster term counts, each indicative of an amount of terms in a cluster of the plurality of instruction clusters; identifying in the plurality of cluster term counts a maximum cluster term count; computing a plurality of term frequencies, each for one of the plurality of cluster terms of the instruction cluster and indicative of a frequency of the respective cluster term in the plurality of cluster terms; computing a plurality of instruction term frequencies, each for one of the group of historical investigation instructions clustered in the instruction cluster and indicative of a sum of a group of term frequencies, each a respective term frequency of one of a group of cluster terms selected from the plurality of cluster terms such that the group of cluster terms were extracted from the respective historical investigation instruction; computing a plurality of action times, each for one of the group of historical investigation instructions clustered in the instruction cluster and indicative of an amount of time a user interacted with the incident management system when executing the respective historical investigation instruction; identifying in the plurality of action times a maximum action time; computing a plurality of elapsed time values, each for one of the group of historical investigation instructions clustered in the instruction cluster and indicative of an amount of days since the respective historical investigation instruction was executed by the incident management system; computing a plurality of instruction scores, each computed for one of the group of historical investigation instructions clustered in the instruction cluster by: adding 1 to the respective elapsed time value of the historical investigation instruction to produce an intermediate term; computing a base 10 logarithm of the intermediate term to produce a log term; multiplying the maximum cluster term count by the maximum action time and by the log term to produce a divider; multiplying the respective instruction term frequency of the historical investigation instruction by the respective action time of the historical investigation instruction to produce a product value; and dividing the product value by the divider to produce the instruction score; and computing a sum of the plurality of instruction scores to produce the respective score of the instruction cluster. Optionally, computing the respective score of the instruction cluster comprises providing the plurality of cluster terms to at least one machine learning model trained to compute a score in response to a plurality of cluster terms. Computing the respective score of the instruction cluster according to a plurality of cluster terms extracted from the respective of historical investigation instructions of the instruction cluster increase accuracy of the respective score of the instruction cluster, increasing accuracy of selection of the cluster and thus increasing accuracy of the sequence of investigation instructions.

With reference to the first and second aspects, in a fourth possible implementation of the first and second aspects of the present invention presenting the sequence of investigation instructions is in an alert of the incident management system generated in response to receiving the incident report. Optionally, presenting the sequence of investigation instructions in the GUI comprises: displaying the GUI on at least one display device connected to the at least one hardware processor; and for each of the sequence of investigation instructions, displaying a visual representation thereof on the at least one display device. Optionally, presenting the sequence of investigation instructions comprises presenting in the GUI an estimated time for investigation of the incident documented by the incident report. Presenting in the GUI an estimated time for investigation of the incident increases usability of the incident management system. Optionally, presenting the estimated time for investigation comprises presenting a plurality of graphs, each depicting an estimated amount of time for investigation for one of a plurality of users. Optionally, at least one of the plurality of graphs is presented in a first color; at least another of the plurality of graphs is presented in a second color; and the first color is different than the second color. Optionally, at least one of the plurality of graphs depicts a plurality of estimated times, each associated with one of the sequence of investigation instructions. Presenting the estimated time for investigation in a plurality of graphs where each depicts a plurality of estimated times associated with the sequence of investigation instructions facilitates estimating, by the user, a possible duration of a cause-analysis of the incident, and thus increases usability of the incident management system. Displaying each of the plurality of graphs in a separate color facilitates distinguishing between the plurality of graphs, further increasing usability of the incident management system.

With reference to the first and second aspects, in a fifth possible implementation of the first and second aspects of the present invention for at least one log of the plurality of logs, one or more of the at least one historical investigation instruction documented thereby is selected from the list of instructions of: a query of the incident management system, a filter instruction, a sorting instruction, a universal resource locator (URL), a command line instruction, and a presentation instruction. Optionally, for at least one log of the plurality of logs, one or more of the at least one parameter range of the at least one historical investigation instruction documented thereby is selected from the list of parameters ranges of: a range of time values, a range of account credentials, a range of user properties, an instruction property, a range of instruction argument data, a range of status values, a range of network addresses, a range of network ports, and a range of error values. Optionally, for at least one log of the plurality of logs, one or more of the presentation type of the at least one historical investigation instruction documented thereby is selected from the list of presentation types of: a chart, a graph, a dashboard, a table, and a list.

With reference to the first and second aspects, in a sixth possible implementation of the first and second aspects of the present invention the at least one hardware processor is further adapted for: receiving from the user at least one feedback value associated with the sequence of investigation instructions; and using the at least one feedback value when computing another sequence of investigation instructions in a future iteration of the plurality of iterations. Using feedback when computing another sequence of investigation instructions increases accuracy of the other sequence of investigation instructions, increasing usability of the incident management system.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments pertain. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

DESCRIPTION OF SPECIFIC EMBODIMENTS OF THE INVENTION

Figure 1:
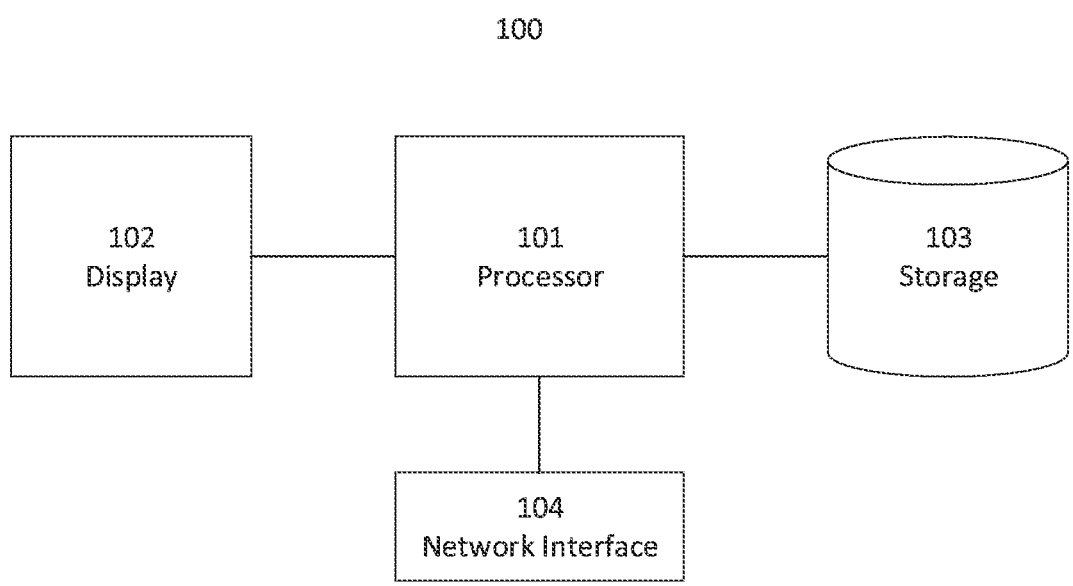
FIG. 1 is a schematic block diagram of an exemplary system, according to some embodiments.

Some embodiments described in the present disclosure relate to a computerized system and, more specifically, but not exclusively, to managing incidents in a computerized system.

According to some incident management practices, in response to the incident report the IT professional executes a sequence of investigation instructions to collect and present analysis data that the IT professional then uses to perform a cause-analysis of the documented incident. For example, after the IT professional sees the incident report in the GUI, the IT professional may execute a query of the management system. A query of the management system may access one or more repositories thereof. For example, the management system may have a repository for storing historical log entries of the monitored system. Additionally, or alternatively, a query of the management system may access a repository of the monitored system. Another example of an investigation instruction is a sort instruction, for example to sort data received in response to executing another investigation instruction. Other investigation instructions include, but are not limited to, a filter instruction, accessing a universal resource locator (URL), and a command line instruction. An investigation instruction may be a presentation instruction, for example instructing the management system's GUI to present a response to another investigation instruction in a selected presentation type, for example a table or a graph. A URL may be a URL to a service provided by the management system, for example a dashboard or a built-in procedure. An investigation instruction may be an instruction to search a keyword in a repository of logs. Some investigation instructions access a resource of the management system. Some other investigation instructions access a resource of another system, for example a log collection system such as Elastic's Elasticsearch, or a visualization system such as Grafana or Elastic's Kibana.

For brevity, the term "user" is used to mean an IT professional, and the terms are used interchangeably.

Some incident management practices include pre-defined procedures for an IT professional to use when investigating an incident. Such a procedure defines an identified sequence of investigation instructions the user should instruct the management system to perform, for example one or more identified queries. However, not all incidents can be resolved using such pre-defined procedures and it is common for incident investigation to have a trial-and-error nature. In addition, it may be that a response to one incident instruction effects selection of a following incident instruction. Additionally, it may be that one or more values extracted from the response to the one incident instruction are used as parameters of the following incident instruction. How many trials and errors are performed, i.e. how many investigation instructions the user initiates, which investigation instructions the user initiates, what parameter values are used in the investigation instructions and how long is needed by the user to perform a cause-analysis of the incident, are frequently a result of the user's experience and competence. For example, when an incident report documents access to a restricted resource, for example a restricted file, an experienced or more competent user may suspect a remote access to the restricted resource. Such a competent user may start an investigation by extracting from the incident report user credentials used to access the restricted resource, query the management system for historical network traffic, and search for the user credentials in the network traffic. Such a competent user may then extract a source network address from a message containing the user credentials to identify a source from which the restricted resource was accessed. In this example, another path of investigation may be to execute a command line instruction to retrieve a configuration of a firewall of the monitored system and present the response in a manner that allows the user to identify a part of the configuration that allowed remote access to the digital configuration network. On the other hand, a less experienced user may not suspect a remote access to begin with and may start an investigation by instructing execution of some investigation instructions that do not contribute to resolving the incident, for example querying an access server of the monitored system. Even when executing an investigation instruction that could contribute to resolution of the incident, a less experienced user may not identify useful information in a result of executing the investigation instruction. For example, a less experienced user not suspecting remote access may not recognize network traffic as being inappropriate, and may not know to check a firewall's configuration. In this example at some point such a less experienced user may also investigate a possible remote access, however this may be after a significant amount of time was spent investigating other possibilities, using other investigation instructions that did not contribute to a resolution of the incident.

There is a need to increase efficiency of incident investigation, i.e. to reduce an amount of investigation instructions that are executed but that do not contribute to performing a cause-analysis of the incident.

As a user gains experience, the user may rely on memories of past investigations to improve the efficiency of their work. However, incident investigation experience sharing between users is not always formal and there is a significant amount of experience that is not shared. Over time, an IT professional having access to experience of other IT professionals is more likely to collect the analysis data for the cause-analysis more efficiently, i.e. faster and using fewer investigation instructions than another IT professional relying solely on their own experience. There is a need to increase sharing of experience in investigating incident reports.

The present disclosure, in some embodiments described herewithin, proposes accessing documentation of a plurality of historical investigation instructions and analyzing the documentation to generate a sequence of investigation instructions that may be executed in response to an incident report documenting an incident. Optionally, the sequence of investigation instructions is generated when a user selects the incident report from a plurality of incident reports presented in a GUI of the incident management system. Optionally, the sequence of investigation instructions is generated before the user selects the incident report and independent thereof. In such embodiments, the present disclosure further proposes that the sequence of investigation instructions, when executed, generate part of the GUI of an incident management system that depicts analysis data for cause-analysis of the incident. Optionally, the sequence of investigation instructions is presented in the GUI of the incident management system such that when the user selects one or more of the sequence of investigation instructions, the selected one or more investigation instructions are executed. Optionally, the sequence of investigation instructions is presented comprising a plurality of graphs, each depicting an estimated amount of time for investigation for one of a plurality of users. For example, a graph may depict a plurality of estimated times, where each of the plurality of estimated times is associated with one of the sequence of investigation instructions. Presenting the user with one or more graphs depicting estimated times associated with the sequence of investigation instructions increases a likelihood of the user choosing an efficient sequence of investigation instructions and thus increases usability of the incident management system. Each of the plurality of graphs may be presented in a separate color, making it easier for the user to distinguish between the plurality of graphs, thus increasing usability of the incident management system compared to presenting the plurality of graphs in a common color.

Optionally, the above steps are repeated in a plurality of iterations, where in each iteration the user selects an incident report and the incident management system generates and presents a sequence of investigation instructions for generating a part of the GUI that depicts analysis data for a data-analysis for the incident report selected in the investigation iteration.

In addition, the present disclosure proposes documenting the plurality of historical investigation instructions in a plurality of logs, where each log documents one or more historical investigation instruction executed in the incident management system. Optionally, each log comprises one or more parameter ranges of the respective one or more historical investigation instructions. Optionally, each log comprises a presentation type of response data received in response to executing the respective one or more historical instructions. Analyzing one or more parameter ranges of one or more historical investigation instructions, and additionally or alternatively a presentation type of response data, increases accuracy of the generated sequence of investigation instructions. Some examples of a parameter range are a range of time values, a range of account credentials, a range of user properties, a range of instruction argument data, a range of status values, a range of network flow identification values, and a range of error values. A range may be one value, for example one account identifier. Some examples of a presentation type are a chart, a graph, a dashboard, a table and a list. Increasing accuracy of the generated sequence of investigation instruction increases accuracy of analysis data depicted in the GUI when the sequence of investigation instructions is executed, facilitating reducing an amount of time it takes a user to perform cause-analysis of an incident and thus increasing usability of the incident management system.

In addition, the present disclosure proposes to optionally identify in the plurality of logs a plurality of historical incident reports that are similar to the incident report according to one or more similarity tests, for example according to an error code in the incident report. Optionally, the plurality of historical investigation events are each associated with one of the plurality of historical incident reports. Analyzing a plurality of historical investigation instructions associated with one or more historical incident reports that are similar to the incident report increases accuracy of the generated sequence of investigation instructions. The present disclosure further proposes, in some embodiments, clustering the plurality of historical investigation instructions in a plurality of instruction clusters according to the respective investigation instruction, the respective one or more parameter ranges and the one or more presentation type and computing a score for each of the plurality of instruction clusters, where the score is indicative of a contribution of the respective group of historical investigation instructions clustered in the respective instruction cluster to one or more cause-analysis of one or more historical incidents documented by the respective group of historical investigation instructions. Additionally, or alternatively, the score is indicative of a contribution of the respective one or more parameter ranges and the respective presentation type of the respective instruction cluster to the one or more cause-analysis. Optionally, the sequence of investigation instructions is generated according to a plurality of scores of the plurality of instruction clusters. Generating the sequence of investigation instructions according to a score indicative of a contribution to the one or more cause-analysis of the respective group of historical instructions and additionally or alternatively of the respective one or more parameter ranges and additionally or alternatively of the respective presentation type increases accuracy of the generated sequence of investigation instructions by increasing a likelihood that each of the generated sequence of investigation instructions contributes to a cause-analysis of the incident documented by the incident report.

Optionally, clustering the plurality of historical investigation instructions is according to a plurality of statistical values computing using a plurality of terms extracted from the plurality of logs. Optionally, the plurality of terms comprises a plurality of parameter ranges of the plurality of historical investigation instructions. Optionally, the plurality of terms comprises a plurality of presentation types of the plurality of historical investigation instructions. Optionally, the plurality of terms comprises a plurality of parts of instructions. Some of the plurality of statistical values may be indicative of one or more distances between some of the plurality of terms. Some other of the plurality of statistical values are optionally indicative of a density function of the plurality of terms. Yet some other of the plurality of statistical value are optionally indicative of a frequency at which one or more terms occur in the plurality of terms.

Optionally, computing the score for an instruction cluster comprises computing a plurality of cluster terms extracted from the respective group of historical investigation instructions of the instruction cluster, from the respective one or more parameter ranges of the instruction cluster and the respective presentation type of the instruction cluster. A cluster term may be a part of an investigation instruction.

Optionally, computing the score comprises providing the plurality of cluster terms to one or more machine learning models trained to compute a score in response to a plurality of cluster terms. Optionally, computing the score comprises computing a plurality of cluster statistical values using the plurality of cluster terms. Optionally, common non-relevant words are removed from the plurality of cluster terms before computing the plurality of cluster statistical values. Some examples of a non-relevant word are "the" and "a". Optionally, a cluster statistical value is indicative of an amount of time a user engaged with an outcome of an instruction, for example an amount of time the user viewed a web page. Optionally, a cluster statistical value is indicative of an amount of time between beginning execution of an investigation instruction and completion of execution thereof. Optionally, a cluster statistical value is indicative of an amount of time between selecting an incident report and executing the investigation instructions.

Optionally, generating a new instruction of the sequence of investigation instructions comprises selecting an instruction cluster of the plurality of instruction clusters according to the plurality of scores of the plurality of instruction clusters. Optionally, generating the new instruction comprises generating an executable instruction, where the executable instruction comprises at least part of at least one of the respective group of historical investigation instructions of the selected instruction cluster. Optionally, the executable instruction comprises one or more new parameter ranges computed according to the respective one or more parameter ranges of the selected instruction cluster. Optionally, the executable instruction comprises a presentation type computed according to the respective presentation type of the selected instruction cluster.

In addition, in some embodiments the present disclosure proposes improving the accuracy of a proposed sequence of investigation instructions based on feedback received from the user regarding a previous sequence of investigation instructions. Thus, in some embodiments the present disclosure proposes receiving from the user one or more feedback values associated with the sequence of investigation instructions and using the one or more feedback values when computing another sequence of investigation instructions in a future iteration.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java, Object-Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showing a schematic block diagram of an exemplary system 100, according to some embodiments. In such embodiments, at least one hardware processor 101 is connected to at least one display device 102, optionally for the purpose of displaying a GUI of system 100. An example of a display device is a monitor, for example a CRT monitor or a liquid crystal diode (LCD) monitor. Another example of a display device is a touch screen.

For brevity, henceforth the term "processing unit" is used to mean "at least one hardware processor" and the terms are used interchangeably.

Optionally, processing unit 101 is connected to one or more non-volatile digital storage 103. Optionally, one or more logs, each documenting one or more historical investigation instructions, are stored on one or more non-volatile digital storage 103. For brevity, henceforth the term "storage 103" refers to one or more non-volatile digital storage 103. Some examples of a non-volatile digital storage include, but are not limited to, a hard disk drive, a solid stated drive, a network connected storage and a storage network. Optionally, processing unit 101 is connected to storage 103 via one or more digital communication network interface 104. Optionally, processing unit 101 is connected to at least one other hardware processor via one or more digital communication network interface 104, for example one or more hardware processors of a monitored system, managed by system 100.

In some embodiments, system 100 implements the following optional method.

Figure 2:
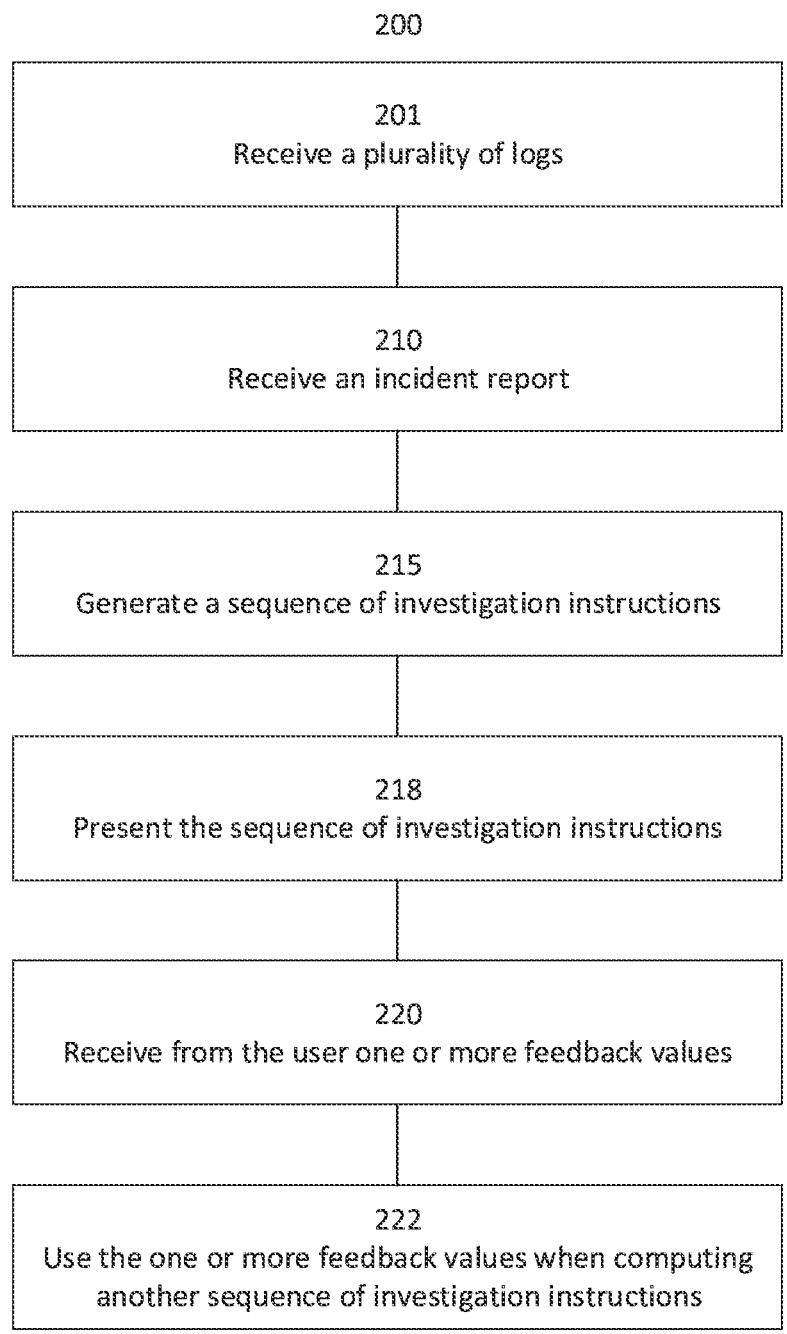
FIG. 2 is a flowchart schematically representing an optional flow of operations for an incident management system, according to some embodiments.

Reference is now made also to FIG. 2, showing a flowchart schematically representing an optional flow of operations 200 for an incident management system, according to some embodiments. In such embodiments, in 201 processing unit 101 receives a plurality of logs, each documenting one or more historical investigation instructions. Optionally, the one or more historical investigation instructions were executed in system 100. Some examples of an investigation instruction include a query of system 100, a filter instruction, a sorting instruction, a URL, a command line instructions and a presentation instruction. A presentation instruction is optionally an instruction to draw a graph or a table. Optionally, a presentation instruction is an instruction to open a dashboard, edit a dashboard or create a dashboard. A URL may be to access another monitoring system or another part of the GUI of system 100. Optionally, each of the plurality of logs comprises one or more parameter ranges of the one or more historical investigation instructions. A parameter range may be a range of time values, for example when the historical investigation instruction is a query to a database, the range of times may be a range of times associated with retrieved entries. Optionally a parameter range has one value. Other examples of a parameter range include a range of account credentials, for example a user name, a user identifier, a user type, and a password value. Additional examples of a parameter range include a range of user properties, for example a membership in a group or range of groups, an instruction property, for example a mute property for an alert and a threshold value, a range of instruction argument data, for example terms of a query and a recommended user action such as click, selection and feedback, a range of status values, for example an indication when data was saved and an amount of time a recommendation was offered, a range of network addresses, a range of network ports, and a range of error values. Optionally, each of the plurality of logs comprises a presentation type of response data received in response to executing the one or more historical investigation instructions. Some examples of a presentation type include a graph, a table, a chart, a dashboard, and a list. A presentation type may be a presentation instruction. Optionally, a URL is a parameter in a presentation instruction.

Optionally, some of the plurality of logs document one or more historical investigation instructions executed in response to a historical incident report received from a monitored system from which the incident report was received. Optionally, some other of the plurality of logs document one or more other historical investigation instructions executed in response to another historical incident report received from another monitored system, different from the monitored system from which the incident report was received. Using information regarding incident investigation for more than one monitored system increases accuracy of a generated sequence of investigation instructions. Optionally, processing unit 101 receives the historical incident report and the other historical incident report via one or more digital communication network interface 104.

Optionally, processing unit 101 receives the plurality of logs via one or more digital communication network interface 104. Optionally, processing unit 101 retrieves the plurality of logs from storage 104.

Optionally, in 210 processing unit 101 receives from a GUI of system 100 an incident report. Optionally, a user selects the incident report from a plurality of incident reports presented in the GUI, optionally on at least one display device 102. Optionally, when at least one display device 102 is a touch screen the user selects the incident report by touching the touch screen. Optionally, the user selects the incident report by navigation, for example using a mouse or a keyboard, and a selection action, for example a performing a mouse click or typing a keyboard key.

In 215, processing unit 101 optionally generates a sequence of investigation instructions for generating part of the GUI of system 100. Optionally, the part of the GUI depicts analysis data for cause-analysis of an incident documented by the incident report. Optionally, processing unit 101 generates the sequence of investigation instructions based on the incident report and an analysis of the plurality of logs.

Figure 3:
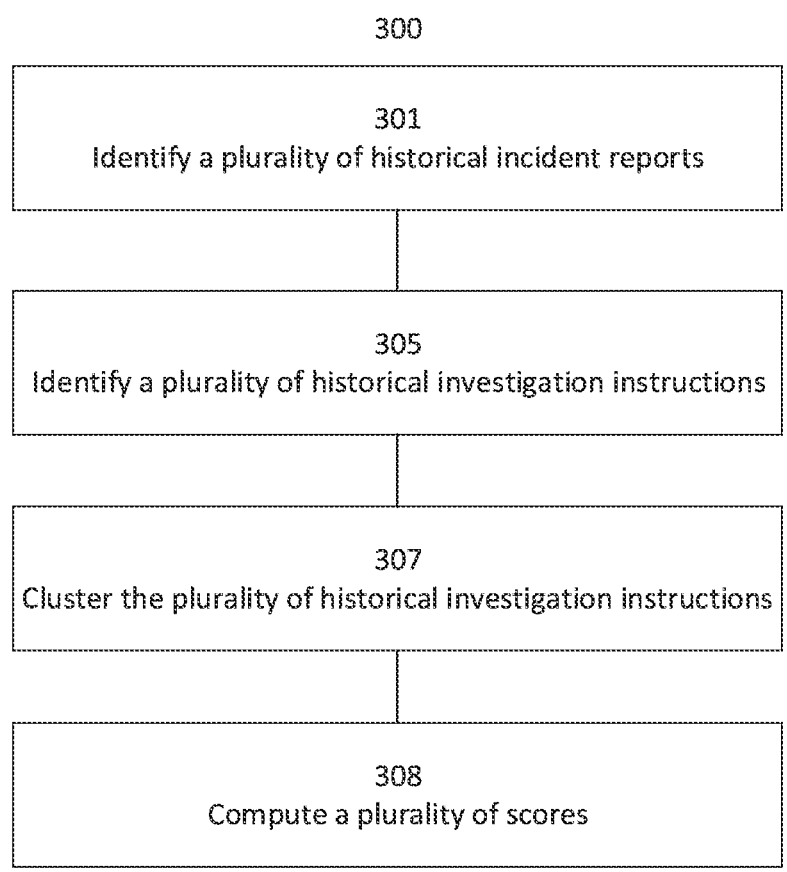
FIG. 3 is a flowchart schematically representing an optional flow of operations for analyzing a plurality of logs, according to some embodiments.

Reference is now made also to FIG. 3, showing a flowchart schematically representing an optional flow of operations 300 for analyzing a plurality of logs, according to some embodiments. In such embodiments, in 301 processing unit 101 identifies a plurality of historical investigation instructions in the plurality of logs. Optionally, processing unit 101 identifies the plurality of historical investigation events by identifying in the plurality of logs a plurality of historical incident report selections, each of the plurality of historical incident report selections selecting a historical incident report that is similar to the incident report selected by the user. Optionally, determining that the historical incident report is similar to the incident report selected by the user is according to one or more incident similarity tests. For example, the historical incident report may be similar to the incident report when each of the two are associated with a common resource or a common error message. In 305, processing unit 101 optionally identifies in the plurality of logs a plurality of historical investigation instructions that are each associated with one of the plurality of historical incident reports. A historical investigation instruction may be associated with a historical incident report when the historical investigation instruction is executed immediately after selection of the historical incident report, optionally by a common user. Optionally, the historical incident report is associated with a unique incident identification value of a plurality of incident identification values. Optionally, each historical investigation instruction is associated with an incident identification value of the plurality of incident identification values. Optionally, a historical investigation instruction is associated with a historical incident report according to the respective unique incident identification value of the historical incident report and the incident identification value associated with the historical investigation instruction. Optionally, selection of the historical incident report is associated with one or more investigation identification values. Some examples of an investigation identification value include, but are not limited to, an account identifier, for example of an account used when performing an investigation of the incident documented by the historical incident report, a user identifier, for example of a user performing an investigation of the incident documented by the historical incident report, and a session identifier, for example of an investigation session when investigating the incident documented by the historical incident report. Optionally a session identifier is indicative of a window in a browsing application. Optionally, each of the plurality of historical investigation instructions is associated with one or more other investigation identification values. Optionally, a historical incident report is associated with a historical incident report according to the respective one or more investigation identification value of the historical incident report and the one or more other investigation identification values associated with the historical investigation instruction.

In 307, processing unit 101 optionally clusters the plurality of historical investigation instructions in a plurality of instruction clusters according to the respective investigation instruction of each of the plurality of historical investigation instructions, the respective one or more parameter ranges thereof and the respective presentation type thereof.

Figure 4:
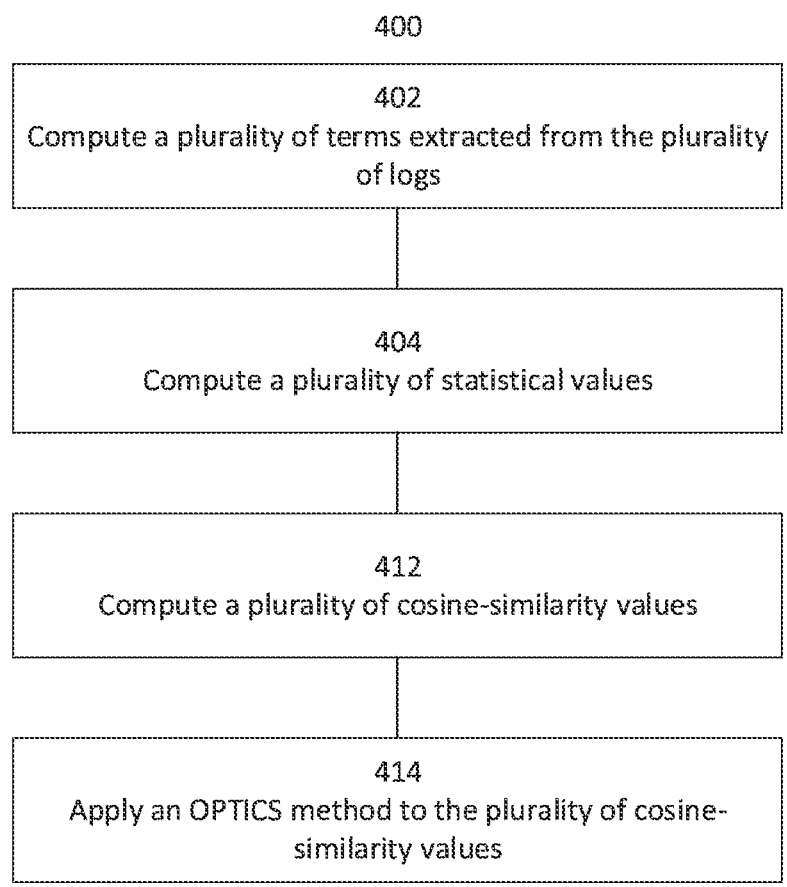
FIG. 4 is a flowchart schematically representing an optional flow of operations for clustering a plurality of historical investigation instructions, according to some embodiments.

Reference is now made also to FIG. 4, showing a flowchart schematically representing an optional flow of operations 400 for clustering a plurality of historical investigation instructions, according to some embodiments. In 402, processing unit 101 optionally computes a plurality of terms extracted from the plurality of logs. Optionally, the plurality of terms comprises a plurality of parameter ranges of the plurality of historical investigation instructions. Optionally, the plurality of terms comprises a plurality of presentation types of the plurality of historical investigation instructions. Optionally, the plurality of terms comprises a plurality of parts of instructions, each a part of one of the plurality of historical investigation instructions. In 404, processing unit 101 optionally computes a plurality of statistical values using the plurality of terms. A statistical value may be indicative of a distance between some of the plurality of terms. Optionally, a statistical value is indicative of a density function of the plurality of terms. Optionally, statistical value is indicative of a frequency at which a terms occurs in the plurality of terms.

In 412, processing unit 101 optionally computes a plurality of cosine-similarity values, where each of the plurality of cosine-similarity values is computed for two of the plurality of terms. Optionally, in 414 processing unit 101 applies an ordering points to identify the clustering structure (OPTICS) method to the plurality of cosine-similarity values. Optionally, processing unit 101 clusters the plurality of historical investigation instructions according to an outcome of applying the OPTICS method to the plurality of cosine-similarity values.

Reference is now made again to FIG. 3. In 308, processing unit 101 optionally computes a plurality of scores, each of the plurality of scores computed for one of the plurality of instruction clusters. Optionally, each of the plurality of scores is indicative of a contribution of the respective group of historical investigation instructions clustered in the respective instruction cluster and of the respective one or more parameter ranges thereof and the respective presentation type thereof to one or more cause-analysis of one or more historical incidents. Optionally, the one or more historical incidents is documented by the respective group of historical investigation instructions.

Optionally, computing the plurality of scores comprises providing the plurality of cluster terms to one or more machine learning models trained to compute a score in response to a plurality of cluster terms. Optionally, the one or more machine learning models comprise one or more neural networks. Optionally, the one or more machine learning models are executed by processing unit 101. Optionally, the one or more machine learning models are executed by yet another hardware processor (not shown).

Optionally, computing the plurality of scores comprises processing unit 101 computing a plurality of cluster terms, where the plurality of cluster terms is extracted from the respective group of historical investigation instructions of the instruction cluster and from the respective one or more parameter ranges thereof and the respective presentation type thereof. Optionally, processing unit 101 computes the respective score of the instruction cluster using the plurality of cluster terms and a plurality of cluster statistical values computed using the plurality of cluster terms.

Following is an example of a plurality of cluster statistical values computed for an instruction cluster and their use to compute a score for the instruction cluster.

In this example, processing unit 101 computes a plurality of cluster term counts, each depicted by AllTerms(cluster) and indicative of an amount of terms in a cluster of the plurality of instruction clusters, and identifies in the plurality of cluster term counts a maximum cluster term count, depicted by Max[AllTerms(cluster)]. Further in this example, processing unit 101 computes a plurality of term frequencies, each for one of the plurality of cluster terms of the instruction cluster and indicative of a frequency of the respective cluster term in the plurality of cluster terms of the instruction cluster. Optionally, processing unit 101 computes a plurality of instruction term frequencies, each depicted by TotalTermFreq(i) and computed for one of the group of historical investigation instructions clustered in the instruction cluster. Optionally, each instruction term frequency is indicative of a sum of a group of term frequencies, where each of the group of term frequencies is a respective term frequency of one of a group of cluster terms selected from the plurality of cluster terms such that the group of cluster terms were extracted from the respective historical investigation instructions of the group of historical investigation instructions clustered in the instruction cluster.

Further in this example, processing unit 101 computes a plurality of action times, each for one of the group of historical investigation instructions clustered in the instruction cluster and depicted by ActionTime(i). Optionally each action time is indicative of an amount of time a user interacted with the incident management system when executing the respective historical investigation instruction, for example an amount of time the user viewed a web page presenting an outcome of executing the respective historical investigation instruction. Optionally, processing unit 101 identifies in the plurality of action times a maximum action time, depicted by Max[ActionTime(i)]. Optionally, processing unit 101 computes a plurality of elapsed time values, each depicted by dDay(i) and computed for one of the group of historical investigation instructions clustered in the instruction cluster. Optionally, each elapsed time value is indicative of an amount of days since the respective historical investigation instructions was executed by system 100.

Optionally, processing unit 101 computes a plurality of instruction scores, one for each of the group of historical investigation instructions clustered in the instruction cluster according to the following formula:

$$InstructionScore(i) = \frac{(TotalTermFreq(i) \times ActionTIme(i))}{\text{Max}_{all\,clusters}[AllTerms\,(\text{cluster})] \times \text{Max}_{0 \le i \le R}[ActionTime(i)]} \times \left[\frac{1}{\log(dDays(i)+1)}\right]$$

Where:
cluster depicts an identification of the instruction cluster;
R depicts an amount of instructions in the group of historical instructions clustered in the cluster identified by cluster;
i depicts an ordinal identifier of one of the group of historical instructions clustered in the cluster identified by cluster;
InstructionScore(i) depicts the instruction score for the historical instruction having an ordinal identified i; and
log( ) depicts the base 10 logarithm function.

Optionally, processing unit 101 computes the score for the instruction cluster by computing a sum of the plurality of instructions scores, as follows:

$$Rank(\text{cluster}) = \sum_{i=0}^{R} InstructionScore(i)$$

Where:
Rank(cluster) depicts the score for the instruction cluster identified by cluster.

Reference is now made again to FIG. 2. Optionally, generating the sequence of investigation instructions in 215 is according to the plurality of scores computed in 308.

Figure 5:
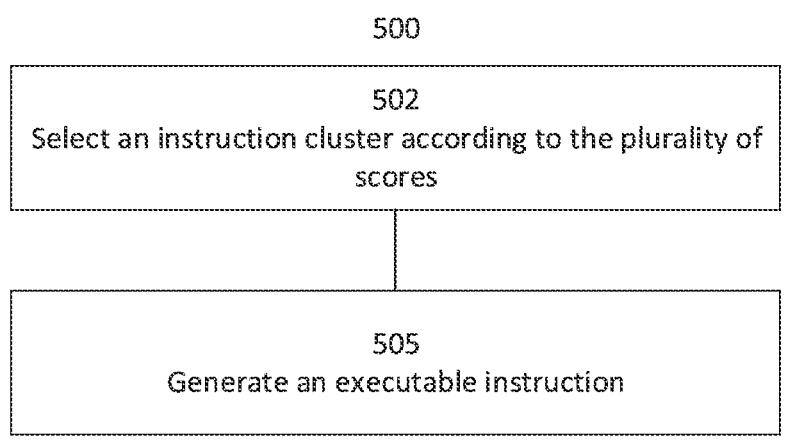
FIG. 5 is a flowchart schematically representing an optional flow of operations for generating an investigation instruction, according to some embodiments.

Optionally, generating the sequence of investigation instructions comprises generating one or more new investigation instructions. Reference is now made also to FIG. 5, showing a flowchart schematically representing an optional flow of operations 500 for generating an investigation instruction, according to some embodiments. Optionally, in 502 processing unit 101 selects an instruction cluster of the plurality of instruction cluster according to the plurality of scores, for example according to a highest score of the plurality of scores. In 505, processing unit 101 optionally generates an executable instruction. Optionally the executable instruction comprises at least part of at least one of the respective group of historical investigation instructions. Optionally, the at least one of the respective group of historical investigation instructions is selected according to the respective instruction score thereof. Optionally, the executable instruction comprises one or more new parameter ranges. Optionally, processing unit 101 computes the one or more new parameter ranges according to the respective one or more parameter ranges of the selected instruction cluster. Optionally, the executable instruction comprises a new presentation type. Optionally, processing unit 101 computes the new presentation type according to the respective presentation type of the selected instruction cluster.

Reference is now made again to FIG. 2. In 218, processing unit 101 optionally presents the sequence of investigation instructions in the GUI of system 100. Optionally, processing unit 101 presents the sequence of investigation instructions such that when the user selects one or more of the sequence of investigation instructions, the selected one or more investigation instructions are executed by processing unit 101. For example, when the user selects one or more of the sequence of investigation instructions processing unit 101 executes one or more respective executable instructions generated using method 500 and each associated with one of the one or more investigation instructions. Optionally, presenting the sequence of investigation instructions comprises presenting an interface for the user to select the executable instruction.

Optionally, presenting the sequence of investigation instructions is in an alert of system 100 generated in response to receiving the incident report.

Optionally, presenting the sequence of investigation instructions comprises displaying the GUI on at least one display device 102. Optionally, presenting the sequence of investigation instruction comprises displaying on at least one display device 102 a visual representation of each of the sequence of investigation instructions.

Optionally, presenting the sequence of investigation instructions comprises presenting in the GUI an estimated time for investigation of the incident documented by the incident report. Optionally, presenting the estimated time for investigation comprises presenting a plurality of graphs, each depicting an estimated amount of time for investigation for one of a plurality of users. Optionally, at least one of the plurality of graphs depicts a plurality of estimated times, each associated with one of the sequence of investigation instructions.

Figure 6:
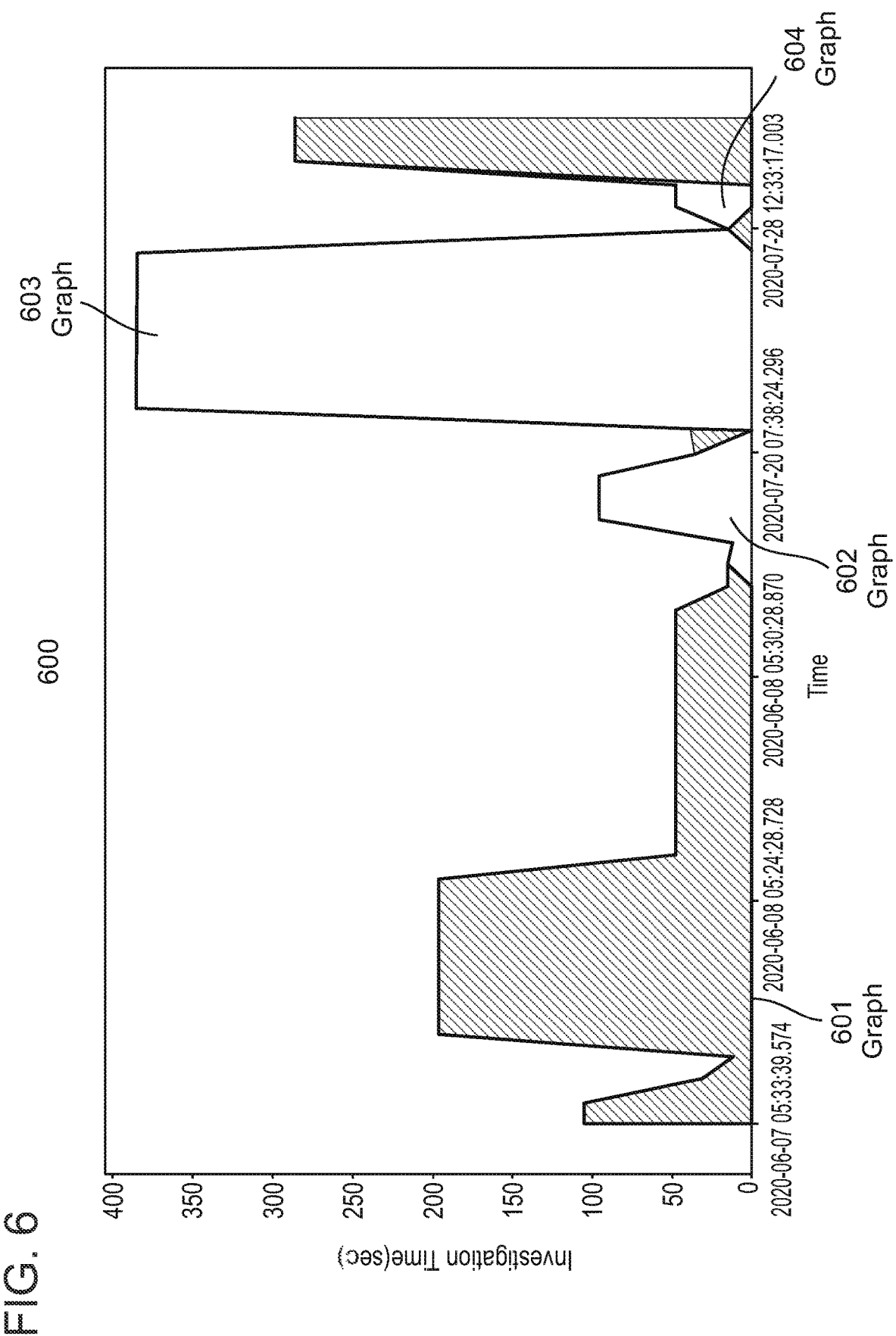
FIG. 6 is a schematic illustration of an exemplary plurality of graphs, according to some embodiments.

Reference is now made also to FIG. 6, showing a schematic illustration of an exemplary plurality of graphs 600, according to some embodiments. In such embodiments, graph 601 depicts an estimated amount of time for investigation for a first user of a plurality of users. Optionally, graph 602 depicts another estimated amount of time for investigation for a second user of the plurality of users. Similarly, graph 603 optionally depicts yet another estimated amount of time for investigation for a third user of the plurality of users and graph 604 optionally depicts yet another estimated amount of time for investigation for a fourth user of the plurality of users. Optionally, graph 601 is presented in a first color, and graph 602 is presented in a second color, where the first color is different from the second color. In this example, the first color is red and the second color is blue.

Reference is now made again to FIG. 2.

Optionally, processing unit 101 repeats 210, 215 and 218 in each of a plurality of iterations. In 220, processing unit 101 optionally receives one or more feedback values from the user. Optionally, the one or more feedback values are associated with the sequence of investigation instructions. Optionally, in 222 processing unit 101 uses the one or more feedback values when computing another sequence of investigation instructions in a future iteration of the plurality of iterations. Optionally, processing unit 101 additionally repeats 220 and 222 in at least some of the plurality of iterations.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant investigation instructions will be developed and the scope of the term investigation instruction is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. An incident management system, comprising at least one hardware processor adapted for:
   receiving a plurality of logs, wherein each of the plurality of logs documenting at least one historical investigation instruction that has been executed in the incident management system and performed, through said execution, a cause-analysis of a respective incident occurring in the past, wherein said each of the plurality of logs comprising at least one parameter range of the at least one historical investigation instruction and a presentation type of response data received in response to executing the at least one historical investigation instruction; and
   in each of a plurality of iterations:

receiving from a graphical user interface (GUI) of the incident management system an incident report which has been selected by a user from a plurality of incident reports presented to said user by said GUI;

generating, based on the incident report and based on an analysis of the plurality of logs, a sequence of investigation instructions, wherein each of said sequence of investigation instructions, when executed, performs a certain cause-analysis of an incident on which said investigation instructions are executed;

presenting the sequence of investigation instructions in the GUI of the incident management system;

upon identifying a user selection of at least one investigation instruction of the sequence of investigation instructions, executing the selected at least one investigation instruction on an incident documented by the selected incident report: and generating part of the GUI of the incident management system, depicting analysis data resulted from cause-analysis performed by said execution of the selected at least one investigation instruction on the incident documented by the selected incident report.

2. The incident management system of claim 1, wherein for at least one log of the plurality of logs, one or more of the at least one historical investigation instruction documented thereby is selected from the list of instructions of: a query of the incident management system, a filter instruction, a sorting instruction, a universal resource locator (URL), a command line instruction, and a presentation instruction.

3. The incident management system of claim 1, wherein for at least one log of the plurality of logs, one or more of the at least one parameter range of the at least one historical investigation instruction documented thereby is selected from the list of parameters ranges of: a range of time values, a range of account credentials, a range of user properties, an instruction property, a range of instruction argument data, a range of status values, a range of network addresses, a range of network ports, and a range of error values.

4. The incident management system of claim 1, wherein for at least one log of the plurality of logs, one or more of the presentation type of the at least one historical investigation instruction documented thereby is selected from the list of presentation types of: a chart, a graph, a dashboard, a table, and a list.

5. The incident management system of claim 1, wherein the analysis of the plurality of logs comprises:
identifying a plurality of historical incident reports by identifying in the plurality of logs a plurality of historical incident report selections, each selecting a historical incident report similar to the incident report according to at least one incident similarity test;
identifying in the plurality of logs a plurality of historical investigation instructions each associated with one of the plurality of historical incident reports; and
clustering the plurality of historical investigation instructions in a plurality of instruction clusters according to a respective investigation instruction, a respective at least one parameter range and a respective presentation type.

6. The incident management system of claim 5, wherein the analysis of the plurality of logs further comprises computing a plurality of scores, each for one of the plurality of instruction clusters and indicative of a contribution, to at least one cause-analysis of at least one historical incident documented by a respective group of historical investigation instructions clustered in the respective instruction cluster, of the respective group of historical investigation instructions and of the respective at least one parameter range thereof and the respective presentation type thereof; and wherein generating the sequence of investigation instructions is according to the plurality of scores.

7. The incident management system of claim 6, wherein generating the sequence of investigation instructions according to the plurality of scores comprises generating at least one new instruction by:
selecting an instruction cluster of the plurality of instruction clusters according to the plurality of scores; and
generating an executable instruction comprising at least part of at least one of the respective group of historical investigation instructions, at least one new parameter range computed according to the respective at least one parameter range of the selected instruction cluster and a new presentation type computed according to the respective presentation type of the selected instruction cluster.

8. The incident management system of claim 7, wherein presenting the sequence of investigation instructions comprises presenting an interface for the user to select the executable instruction.

9. The incident management system of claim 1, wherein presenting the sequence of investigation instructions is in an alert of the incident management system generated in response to receiving the incident report.

10. The incident management system of claim 5, wherein clustering the plurality of historical investigation instructions comprises:
computing a plurality of terms extracted from the plurality of logs and comprising a plurality of parameter ranges of the plurality of historical investigation instructions, a plurality of presentation types of the plurality of historical investigation instructions, and a plurality of parts of instructions; and
computing a plurality of statistical values using the plurality of terms.

11. The incident management system of claim 10, wherein clustering the plurality of historical investigation instructions further comprises:
computing a plurality of cosine-similarity values, each for two of the plurality of terms; and
applying an ordering points to identify the clustering structure (OPTICS) method to the plurality of cosine-similarity values.

12. The incident management system of claim 6, wherein computing the plurality of scores comprises for each instruction cluster of the plurality of instruction clusters:
computing a plurality of cluster terms extracted from the respective group of historical investigation instructions of the instruction cluster and from the respective at least one parameter range thereof and the respective presentation type thereof;
computing the respective score of the instruction cluster using the plurality of cluster terms and a plurality of cluster statistical values computed using the plurality of cluster terms.

13. The incident management system of claim 12, wherein computing the respective score of the instruction cluster comprises:
computing a plurality of cluster term counts, each indicative of an amount of terms in a cluster of the plurality of instruction clusters;
identifying in the plurality of cluster term counts a maximum cluster term count;

computing a plurality of term frequencies, each for one of the plurality of cluster terms of the instruction cluster and indicative of a frequency of the respective cluster term in the plurality of cluster terms;

computing a plurality of instruction term frequencies, each for one of the group of historical investigation instructions clustered in the instruction cluster and indicative of a sum of a group of term frequencies, each a respective term frequency of one of a group of cluster terms selected from the plurality of cluster terms such that the group of cluster terms were extracted from the respective historical investigation instruction;

computing a plurality of action times, each for one of the group of historical investigation instructions clustered in the instruction cluster and indicative of an amount of time a user interacted with the incident management system when executing the respective historical investigation instruction;

identifying in the plurality of action times a maximum action time;

computing a plurality of elapsed time values, each for one of the group of historical investigation instructions clustered in the instruction cluster and indicative of an amount of days since the respective historical investigation instruction was executed by the incident management system;

computing a plurality of instruction scores, each computed for one of the group of historical investigation instructions clustered in the instruction cluster by:
adding 1 to the respective elapsed time value of the historical investigation instruction to produce an intermediate term;
computing a base 10 logarithm of the intermediate term to produce a log term;
multiplying the maximum cluster term count by the maximum action time and by the log term to produce a divider;
multiplying the respective instruction term frequency of the historical investigation instruction by the respective action time of the historical investigation instruction to produce a product value; and
dividing the product value by the divider to produce the instruction score; and computing a sum of the plurality of instruction scores to produce the respective score of the instruction cluster.

14. The incident management system of claim 12, wherein computing the respective score of the instruction cluster comprises providing the plurality of cluster terms to at least one machine learning model trained to compute a score in response to a plurality of cluster terms.

15. The incident management system of claim 1, wherein presenting the sequence of investigation instructions in the GUI comprises:
displaying the GUI on at least one display device connected to the at least one hardware processor; and
for each of the sequence of investigation instructions, displaying a visual representation thereof on the at least one display device.

16. The incident management system of claim 1, wherein presenting the sequence of investigation instructions comprises presenting in the GUI an estimated time for investigation of the incident documented by the incident report.

17. The incident management system of claim 16, wherein presenting the estimated time for investigation comprises presenting a plurality of graphs, each depicting an estimated amount of time for investigation for one of a plurality of users.

18. The incident management system of claim 17 wherein at least one of the plurality of graphs is presented in a first color;
at least another of the plurality of graphs is presented in a second color; and
the first color is different than the second color.

19. The incident management system of claim 17 wherein at least one of the plurality of graphs depicts a plurality of estimated times, each associated with one of the sequence of investigation instructions.

20. The incident management system of claim 1, wherein the at least one hardware processor is further adapted for:
receiving from the user at least one feedback value associated with the sequence of investigation instructions; and
using the at least one feedback value when computing another sequence of investigation instructions in a future iteration of the plurality of iterations.

21. A method for an incident management system, comprising:
receiving a plurality of logs, wherein each of the plurality of logs documenting at least one historical investigation instruction that has been executed in the incident management system and performed, through said execution, a cause-analysis of a respective incident occurring in the past, wherein said each of the plurality of logs comprising at least one parameter range of the at least one historical investigation instruction and a presentation type of response data received in response to executing the at least one historical investigation instruction; and
in each of a plurality of iterations:
receiving from a graphical user interface (GUI) of the incident management system an incident report which has been selected by a user from a plurality of incident reports presented to said user by said GUI;
generating, based on the incident report and based on an analysis of the plurality of logs, a sequence of investigation instructions, wherein each of said sequence of investigation instructions, when executed, performs a certain cause-analysis of an incident on which said investigation instructions are executed;
presenting the sequence of investigation instructions in the GUI of the incident management system;
upon identifying a user selection of at least one investigation instruction of the sequence of investigation instructions, executing the selected at least one investigation instruction on an incident documented by the selected incident report: and
generating part of the GUI of the incident management system, depicting analysis data resulted from cause-analysis performed by said execution of the selected at least one investigation instruction on the incident documented by the selected incident report.

22. A software program product for incident management, comprising:
a non-transitory computer readable storage medium;
first program instructions for
receiving a plurality of logs, wherein each of the plurality of logs documenting at least one historical investigation instruction that has been executed in the incident management system and performed, through said execution, a cause-analysis of a respective incident occurring in the past, wherein each of said plurality of logs said each of the plurality of logs comprising at least one parameter range of the at least one historical investigation instruction and a presentation type of response data received in response to executing the at least one historical investigation instruction; and second program instructions for in each of a plurality of iterations:
  receiving from a graphical user interface (GUI) of the incident management system an incident report which has been selected by a user from a plurality of incident reports presented to said user by said GUI;
  generating, based on the incident report and based on an analysis of the plurality of logs, a sequence of investigation instructions, wherein each of said sequence of investigation instructions, when executed, performs a certain cause-analysis of an incident on which said investigation instructions are executed;
  presenting the sequence of investigation instructions in the GUI of the incident management system;
  upon identifying a user selection of at least one investigation instruction of the sequence of investigation instructions, executing the selected at least one investigation instruction on an incident documented by the selected incident report: and
  generating part of the GUI of the incident management system, depicting analysis data resulted from cause-analysis performed by said execution of the selected at least one investigation instruction on the incident documented by the selected incident report;

wherein the first and second program instructions are executed by at least one computerized processor from the non-transitory computer readable storage medium.

* * * * *